Aug. 25, 1942. E. K. BUXBAUM 2,294,274
APPARATUS FOR HANDLING BISCUITS AND LIKE ARTICLES
Filed July 18, 1941
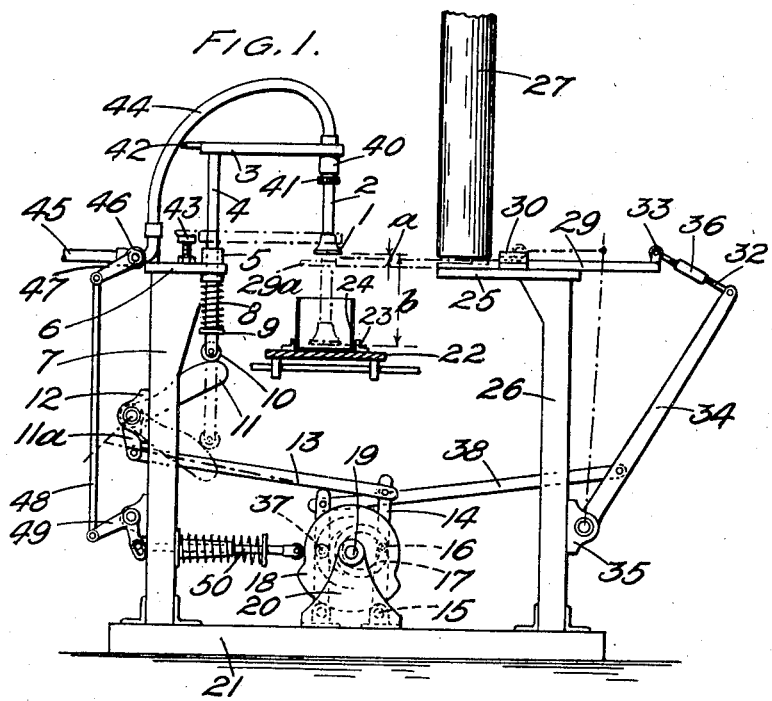
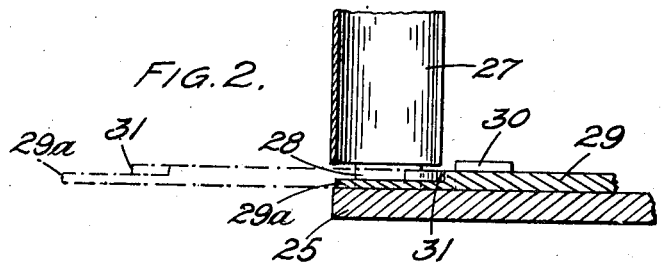
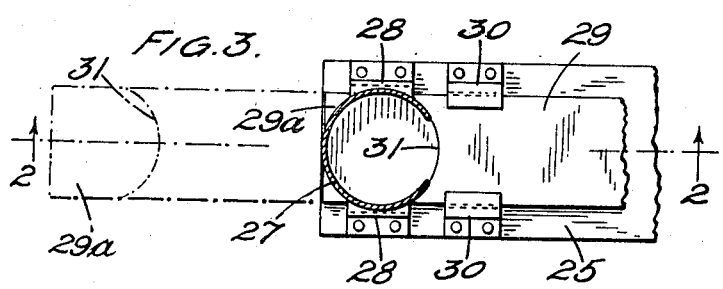

Patented Aug. 25, 1942

2,294,274

UNITED STATES PATENT OFFICE 2,294,274

APPARATUS FOR HANDLING BISCUITS AND LIKE ARTICLES

Erich Karl Buxbaum, London, England

Application July 18, 1941, Serial No. 402,957
In Great Britain June 24, 1940

5 Claims. (Cl. 214—1)

This invention relates to the handling of biscuits and like articles. Owing to their highly friable and brittle nature, biscuits and other articles of confectionery cannot be handled, subsequently to the manufacturing process, satisfactorily by hand. This applies to their removal from the traps or conveyors on which such articles pass out of the last stage of the manufacturing process, their transference to enrobing or icing machines and their packing in containers of all kinds including wrappings.

It has already been proposed to transport biscuits in bulk by entraining them in a powerful current of air through an enclosed conduit. Besides being very restricted in its application, this proposed method has the essential disadvantage of delivering the biscuits in an entirely haphazard manner which inevitably prolongs the work of rearrangement to be effected at the next operation. Moreover, the proportion of biscuits broken in transit is relatively high, particularly in the case of the more delicate sorts.

The present invention has for its object to enable biscuits and like articles to be handled mechanically while avoiding the above mentioned limitations and drawbacks.

In accordance with the foregoing the invention provides a method of moving biscuits and like articles from a high level to a low level consisting in feeding them successively beneath a suction head, lowering the suction head to apply it to the upper surface of the biscuit, applying suction through said head to grip the upper surface of the biscuit, moving said suction head vertically downwards to said low level whilst gripping a biscuit, and terminating said suction.

The invention also provides a method of moving biscuits and like articles from a high level position to a low level position displaced laterally from said high level position, consisting in displacing said biscuits on a horizontally reciprocating support from the high level position to another position at said high level, but beneath a suction head, lowering the suction head to apply it to the upper surface of the biscuit, applying suction to said head to grip the upper surface of the biscuits, retracting said support, moving said suction head vertically downwards whilst carrying a biscuit to the low level position, and terminating said suction.

The invention includes a method of transporting biscuits and the like articles from a supply point into a receptacle by moving the articles from the supply point by horizontal motion to a picking-up point, picking them up by suction, and transferring them by vertical motion into a receptacle beneath said picking-up point.

The invention also includes a method of transporting biscuits and like articles from a hopper into a receptacle at a different level, by removing the articles horizontally from the bottom of said hopper to a picking-up point at the same level, picking up said articles by suction at said picking-up point, and transferring them by vertical motion into a receptacle beneath said picking-up point.

I have found that it is possible by a method according to the invention to pick up biscuits from a given position, for instance on a drying tray or conveyor belt or a slide coacting with a feeding hopper, and to transfer them to and deposit them at another pre-determined position for instance on a conveyor or in a container, with a high degree of accuracy and without damaging them.

In practice the suction head is preferably made of supple resilient material, such as soft rubber, and provided with a flared outer end. In this way the area of contact is increased and the mouth of the suction head is rendered capable of adapting itself to an uneven surface sufficiently well to enable most sorts of biscuits, whether perforated with "docker holes" or not, to be lifted and transferred, as required, with their top surface uppermost. Biscuits having a particularly uneven top surface can also be successfully handled provided they are turned over before reaching the point at which they are picked up by the suction heads. This may conveniently be effected mechanically by known means either before or after the biscuits leave the manufacturing plant proper.

The requisite composite motion of the transporting members, which may comprise arms mounted for pivotal and/or axial movement on plunger rods, is obtained with the aid of any known means, such as cam mechanism. The suction heads are connected to a vacuum source, with the interposition of flexible hose, and the application and cutting off of the vacuum to the individual suction heads is controlled by valves the operation of which is suitably timed. If desired such valves may be controlled by movements of the transporting members themselves. For instance a valve controlling the connection of a suction head to a vacuum source may be opened by the downward movement of the appropriate transporting member which brings the suction head into contact with a biscuit and closed by completion of the movement which brings the assembly into the final or depositing position.

Apparatus according to the invention may comprise a suction head of the kind described mounted on a periodically operable transporting member and connected to a source of vacuum under the control of valve means operated in synchronism with the commencement and termination of a cycle of movement of said transporting member.

The cycle of movement of said transporting member may comprise an initial descending and lifting motion, a translating motion, and a final depositing motion, the initial descending and lifting motion being generally relatvely short. Such apparatus may also comprise a plurality of suction heads mounted so as to be adjustable as to their relative positions, for the purpose of handling a plurality of articles at each cycle of operation.

The described apparatus is preferably constructed in the form of a unit, in order that such handling units may be associated, singly or in batteries, with sets of equipment between which the biscuits or like articles are to be transferred, said sets of equipment being operated intermittently in a required manner during the intervals between the cycles of operation of the handling units.

The said sets of equipment may for instance be a conveyor pertaining to manufacturing plant, on the one hand, and a conveyor pertaining to an enrobing or other treating device, on the other hand, or a feed device on the one hand and a container holding and conveying device on the other hand.

An embodiment of the invention, as applied to the transferring of biscuits from a feed device to containers travelling on a conveyor, is shown, by way of example, in the accompanying drawing, in which:

Figure 1 is a partly diagrammatic end elevation showing the essential parts of a pneumatic biscuit handling unit and its drive.

Figure 2 is a partial section, on an enlarged scale, of the feed device, taken on the line 2—2 of Figure 3.

Figure 3 is a plan view of the feed device.

Referring to Figure 1, a flared or bell-shaped suction head 1 made of soft rubber and having a downwardly directed open mouth, is connected to the lower end of a tubular holding member 2 mounted vertically with its upper end in a horizontal arm 3 attached at its rear end to the top of a plunger rod 4 which works in a sleeve 5 mounted in a table 6 supported on an upright 7 forming part of the main framework of the unit. The plunger rod 4 is urged downwards by a coil spring 8 interposed between the sleeve 5 and a collar 9 on the rod 4, and is equipped at its lower end with a roller 10 with which it bears against one arm of a cam lever 11 pivoted in a bracket 12 attached to the upright 7. The other arm 11a of this cam lever is connected by a link 13 to a post 14 which is pivoted at its lower end as indicated at 15. Intermediately of its ends, the post 14 is provided with a pin 16 which engages in a cam groove 17 in a disc 18 fast on a cam-shaft 19 supported in brackets 20 secured to a bedplate 21. The cam groove 17 is so shaped that in the course of a revolution of disc 18, the post 14 is twice moved inwards towards the cam-shaft 19 from a normal position defined by arcuate portions concentric with the disc 19 and corresponding to the normal position of the assembly comprising parts 1 to 10 shown in full lines in Figure 1. Each of these movements of post 14 causes the said assembly, through the intermediary of link 13 and cam lever 11, to carry out a dipping and return motion of suction head 1 to an extent and with a timing determined by the shape of the cam groove 17. In the present instance, the shaping of the cam groove 17 is such in conjunction with the ratio of the transmission mechanism that a slight dipping and return motion of the suction head 1 through a distance represented by $a$ alternates with a later dipping motion through a distance indicated by $b$. The first and smaller dipping motion is a picking-up motion and the other is the translating and depositing motion, of the suction head and its carrying means and their return motion.

In the present example, the translating and depositing motion of the suction head 1 is vertical, and directly beneath the suction head there is mounted a travelling conveyor 22 equipped with means such as sockets 23 for locating a series of equidistantly spaced containers 24 and adapted to be moved step-wise through a distance corresponding to the centre-to-centre spacing of said containers during the intervals between successive translating and depositing motions of the suction head so as to bring the containers consecutively into position vertically beneath the suction head. The drive for the conveyor 22 may conveniently be taken, with the aid of conventional means (not shown) such as a Geneva cross and suitable transmission gearing, from the camshaft 19 or the power source from which this shaft is driven.

A feed device for the biscuits or like articles to be handled is provided on the opposite side of the unit to the suction head carrying means. This device comprises essentially a table 25 mounted on an upright 26 forming part of the framework of the machine, approximately on a level with the table 6 on the opposite side of the machine. A cylindrical hopper 27 is secured in a vertical position to lateral angular lugs 28, 28 attached to the table 25 near the forward edge thereof, that is to say the edge nearest to the suction head, and with its lower edge spaced from the upper surface of the table so as to allow for the passage beneath it of a slide 29. The slide 29, which rests upon table 25, and travels in lateral guides 30, 30 attached to the table, has a portion 29a of reduced thickness at the forward end, normally situated beneath the hopper 27, and is of such length that, when it is at the end of its forward travel, the portion 29a is located beneath the suction head 1, as indicated in broken lines in Figure 1. The reduced portion 29a of the slide extends to the outer end of the slide (see Figures 2 and 3) and is bounded by an arcuate step or shoulder 31 which conforms to the curvature of the rear portion of the hopper 27 and registers with or is slightly behind the edge of this portion when in the fully retracted position. The depth of the shoulder 31 corresponds to the thickness of a biscuit, so that when the slide is advanced, the lowermost biscuit of the stack in the hopper is pushed from under the remainder of the stack and carried into position beneath the suction head. The remainder of the stack is supported on the thicker portion of the slide until it returns to its starting position when the whole stack comes to rest again on the reduced portion 29a.

It will thus be clear that the shape and size of the biscuits to be handled will determine the dimensions and cross-sectional shape of the hopper and that a change in the thickness only of the biscuits can be allowed for by replacing the slide by another having the same over-all dimensions but a different height of the step 31.

The hopper 27 is slotted lengthwise, preferably at the rear (Figure 3) in order to facilitate manual filling of the hopper.

The rear end of the slide 29 is connected, by means of a link 32 and a readily disengageable ball and socket type connector 33 (to facilitate replacement of the slide), to an arm 34 pivoted at its lower end to a lug 35 on the upright 26. The link 32 is variable in length, for instance by means of a turn-buckle 36, for the purpose of adjusting the end position of the slide 29. The arm 34 is operated from a further cam disc (not shown) attached to the cam shaft 19 behind the cam disc 18, through the intermediary of a post 37 and link 38 functioning in the same manner as the corresponding parts 17 and 13 of the described mechanism for operating the suction head assembly. The timing of the slide operating cam disc is such that the slide is advanced while the suction head 1 is in the fully raised position (corresponding to one of the lands of groove 17) after completion of the translating and depositing motion, retained in the advanced position while the suction head carries out the picking up motion, and retracted during the interval between the picking up motion and the translating and depositing motion while the suction head is again in the raised position (corresponding to the other of the lands of groove 17).

In order to enable slight adjustments to be effected in the end setting of the suction head 1, so as to allow for instance for changing over from the handling of biscuits of one thickness to the handling of biscuits of a different thickness, the tubular holder 2 is threaded in a socket 40 on the arm 3 and locked by means of a nut 41 which also serves to compress a packing element as a safeguard against loss of vacuum.

Means are also preferably provided for enabling the lower limit of the depositing movement of the suction head to be varied. Such means are required for instance when a series of handling units of the kind described and shown are employed for filling containers travelling past them on a horizontal conveyor. In this case there will be as many handling units operating at consecutive stations as there are biscuits or the like to be packed in each container, and it is then desirable for the depositing movement of each consecutive suction head to terminate at a level higher, by an amount corresponding to the thickness of a biscuit, than that of the preceding suction head. In the present example, this adjustment is provided for by equipping the arm 3 with a rear extension 42 adapted to abut against an adjustable stop 43 the stem of which is threaded in the table 6.

The portion of the sleeve 40 extending above the arm 3 is provided with a fitting for the connection of one and of a flexible tube 44 the other end of which is connected to a vacuum main 45 with the interposition of a stop-cock 46 the plug of which carries an arm 47. The arm 47 is operated to connect the suction head to vacuum at the commencement of the picking up motion and to cut off the vacuum at the end of the depositing motion, by means of a link 48, two-armed lever 49, and push rod 50 co-acting with a cam surface on the periphery of cam disc 18.

To summarise, the timing of the several cam controlled operations is such as to bring about the following sequence in the course of a single revolution of the cam-shaft 19:

(1) Advancing of slide 29 to convey a biscuit into position beneath the raised suction head 1 (groove of cam 11).

(2) Operation of valve 46 to connect suction head to vacuum (periphery of cam disc 18).

(3) Picking up motion (short dip and return) of suction head assembly to lift biscuit from slide (groove of cam disc 18).

(4) Retraction of slide 29.

(5) Translating and depositing motion (long dip down) of suction head assembly.

(6) Cutting off of vacuum to release biscuit.

(7) Raising of suction head assembly to elevated starting position (long dip return).

It will be understood that when the pneumatic unit comprises an arm mounted on a plunger rod and having a depending member carrying the suction head, as in the described example, said depending member must be at least as long as the maximum stroke of the plunger rod, in order that the arm will clear the upper edge of any intervening parts or of a container during the depositing movement. The length of the arm will depend upon the design of the pneumatic unit, the lay-out of the equipment with which this unit is to co-operate, and, in the case of packing plant, the size of the containers used.

In applications of the invention in which a plurality of pneumatic units co-operate on the picking up side with a conveyor of the endless belt type carrying a plurality of longitudinal rows of biscuits, one unit is preferably provided for each such row and the units are spaced sufficiently far apart to ensure that the transporting members thereof do not foul each other in carrying out their translational movement.

What I claim and desire to secure by Letters Patent is:

1. Apparatus for transporting biscuits and like articles comprising in combination a vertically movable suction head constructed to carry out short down and up motions between a high level and an intermediate level and long down and up motions between said high level and a low level beneath said intermediate level, means for feeding the articles to be transported by said vertically movable suction head consecutively into the path of said suction head at said intermediate level, said feeding means constructed so as to move between consecutive feedings out of the vertical path of said suction head, and driving means operating said suction head in synchronism with said feeding means to cause a short down and up motion of said suction head each time when said feeding means with one of the articles to be transported is in the path of said suction head at said intermediate level and to cause a long down and up motion of said suction head each time when said feeding means has moved from the path of said head, thereby transporting said article from said intermediate to said low level.

2. Apparatus for transporting biscuits and like articles comprising in combination a vertically movable suction head constructed to carry out short down and up motions between a high level and an intermediate level and long down and up motions between said high level and a low level beneath said intermediate level, a supply hopper containing the articles to be transported, a horizontally movable reciprocating slide for receiving articles from the bottom of said hopper and feeding them consecutively into the path of said suction head at said intermediate level, said reciprocating slide constructed so as to be retracted between consecutive feedings out of the vertical path of said suction head, and driving means constructed so as to cause a short down and up motion of said suction head each time when said slide with one of the articles to be transported is in the path of said suction head at said intermediate level and to cause a long down and up motion of said suction head each time when said slide is retracted from the path of said head.

3. Apparatus for transporting biscuits and like articles comprising in combination a vertically movable suction head constructed to carry out short down and up motions between a high level and an intermediate level and long down and up motions between said high level and a low level beneath said intermediate level, means for feeding the articles to be transported by said vertically movable suction head consecutively into the path of said suction head at said intermediate level, said feeding means constructed so as to move between consecutive feedings out of the vertical path of said suction head, driving means operating said suction head in synchronism with said feeding means to cause a short down and up motion of said suction head each time when said feeding means with one of the articles to be transported is in the path of said suction head at said intermediate level and to cause a long down and up motion of said suction head each time when said feeding means has moved from the path of said head, and means for applying vacuum to said suction head from the termination of said short down motion until termination of said long down motion, thereby consecutively raising the articles to be transported from said feeding means at said intermediate level and depositing them at said low level.

4. Apparatus for transporting biscuits and like articles comprising in combination a vertically movable suction head constructed to carry out short down and up motions between a high level and an intermediate level and long down and up motions between said high level and a low level beneath said intermediate level, means for feeding the articles to be transported by said vertically movable suction head consecutively into the path of said suction head at said intermediate level, said feeding means constructed so as to move between consecutive feedings out of the vertical path of said suction head, driving means operating said suction head in synchronism with said feeding means to cause a short down and up motion of said suction head each time when said feeding means with one of the articles to be transported is in the path of said suction head at said intermediate level and to cause a long down and up motion of said suction head each time when said feeding means has moved from the path of said head, means for applying vacuum to said suction head from the termination of said short down motion until termination of said long down motion, thereby consecutively raising the articles to be transported from said feeding means at said intermediate level and depositing them at said low level, and means for removing said articles when deposited at said low level.

5. Apparatus for transporting biscuits and like articles comprising in combination a vertically movable suction head constructed to carry out short down and up motions between a high level and an intermediate level and long down and up motions between said high level and a low level beneath said intermediate level, a supply hopper containing the articles to be transported, a horizontally movable reciprocating slide for receiving articles from the bottom of said hopper and feeding them consecutively into the path of said suction head at said intermediate level, said reciprocating slide constructed so as to be retracted between consecutive feedings out of the vertical path of said suction head, driving means constructed so as to cause a short down and up motion of said suction head each time when said slide with one of the articles to be transported is in the path of said suction head at said intermediate level and to cause a long down and up motion of said suction head each time when said slide is retracted from the path of said head, means for applying vacuum to said suction head from the termination of its short down motion until termination of its long down motion, thereby consecutively raising the articles to be transported from said reciprocating slide at said intermediate level and depositing them at said low level, and means for removing said articles when deposited at said low level.

ERICH KARL BUXBAUM.